(12) United States Patent
Sauvageau et al.

(10) Patent No.: US 11,603,147 B1
(45) Date of Patent: Mar. 14, 2023

(54) TRACK SYSTEM FOR A VEHICLE

(71) Applicant: SOUCY INTERNATIONAL INC., Drummondville (CA)

(72) Inventors: Yves Sauvageau, Drummondville (CA); Branislav Nanac, Drummondville (CA)

(73) Assignee: SOUCY INTERNATIONAL INC., Drummondville (CA)

(*) Notice: Subject to any disclaimer, the term of this patent is extended or adjusted under 35 U.S.C. 154(b) by 220 days.

(21) Appl. No.: 17/165,222

(22) Filed: Feb. 2, 2021

Related U.S. Application Data

(63) Continuation of application No. 16/193,302, filed on Nov. 16, 2018, now Pat. No. 10,933,929.

(60) Provisional application No. 62/588,872, filed on Nov. 20, 2017.

(51) Int. Cl.
| | |
|---|---|
| *B62D 21/11* | (2006.01) |
| *B62D 55/084* | (2006.01) |
| *B62D 21/20* | (2006.01) |
| *B62D 55/06* | (2006.01) |
| *B62D 21/18* | (2006.01) |
| *B62D 55/104* | (2006.01) |
| *B62D 55/065* | (2006.01) |

(52) U.S. Cl.
CPC ............ *B62D 55/084* (2013.01); *B62D 21/11* (2013.01); *B62D 21/186* (2013.01); *B62D 21/20* (2013.01); *B62D 55/06* (2013.01); *B62D 55/0655* (2013.01); *B62D 55/104* (2013.01)

(58) Field of Classification Search
CPC .... B62D 55/084; B62D 21/11; B62D 21/186; B62D 21/20; B62D 55/06; B62D 55/0655; B62D 55/104
See application file for complete search history.

(56) References Cited

U.S. PATENT DOCUMENTS

| | | | |
|---|---|---|---|
| 4,923,257 | A | 5/1990 | Purcell |
| 5,452,949 | A | 9/1995 | Kelderman |
| 5,566,773 | A | 10/1996 | Gersmann |
| 5,954,148 | A | 9/1999 | Okumura |
| 5,988,775 | A | 11/1999 | Nordberg |
| 6,318,484 | B2 | 11/2001 | Lykken et al. |
| 6,810,975 | B2 | 11/2004 | Nagorcka et al. |

(Continued)

*Primary Examiner* — Kevin Hurley
*Assistant Examiner* — Marlon A Arce
(74) *Attorney, Agent, or Firm* — BCF LLP

(57) ABSTRACT

A track system for a vehicle has an attachment assembly mountable to a chassis of a vehicle and defining an attachment-assembly-pivotable connector pivot axis; a track assembly including a support frame disposed laterally outward from the attachment assembly, the support frame including a leading frame assembly and a trailing frame assembly, each frame assembly including a frame member connectable to the attachment assembly pivotable connector and a frame-suspension pivotable connector; at least one wheel-load-bearing connector, and at least one idler wheel being at least indirectly connected to the frame member via the at least one wheel-load-bearing connector. The track system further has a sprocket wheel, an endless track, and a suspension assembly having a forward suspension pivotable connector, a rearward suspension pivotable connector, and leading and trailing suspension members pivotably connected to the forward suspension pivotable connector and to the rearward suspension pivotable connector, and to a link.

17 Claims, 7 Drawing Sheets

(56) References Cited

U.S. PATENT DOCUMENTS

| | | |
|---|---|---|
| 7,111,857 B2 | 9/2006 | Timoney et al. |
| 7,131,508 B2 | 11/2006 | Brazier |
| 8,118,374 B2 | 2/2012 | Canossa |
| 8,960,692 B2 | 2/2015 | Pare et al. |
| 9,079,614 B2 | 7/2015 | Hansen |
| 9,290,216 B2 * | 3/2016 | Fairhead .............. B62D 55/104 |
| 9,308,951 B2 | 4/2016 | Pare et al. |
| 9,415,817 B2 | 8/2016 | Rackow et al. |
| 9,415,818 B1 | 8/2016 | Tiede et al. |
| 9,434,426 B2 | 9/2016 | Nagorcka et al. |
| 10,633,044 B2 | 4/2020 | Sauvageau et al. |
| 2001/0030068 A1 | 10/2001 | Nagorkca et al. |
| 2014/0125118 A1 * | 5/2014 | Nagorcka ............ B62D 55/104 |
| | | 305/132 |
| 2016/0236733 A1 | 8/2016 | Tiede et al. |
| 2016/0297065 A1 | 10/2016 | Summer et al. |
| 2017/0101143 A1 * | 4/2017 | Thomas ................ E02F 3/3414 |
| 2017/0113742 A1 | 4/2017 | Tratta et al. |
| 2017/0225725 A1 * | 8/2017 | Hansen ................ E02F 9/2004 |
| 2017/0225727 A1 | 8/2017 | Sauvageau et al. |
| 2018/0009490 A1 | 1/2018 | Sauvageau et al. |
| 2018/0022408 A1 | 1/2018 | Sauvageau et al. |
| 2021/0253185 A1 * | 8/2021 | Sauvageau ............ B62D 11/003 |
| 2022/0297779 A1 * | 9/2022 | Gordon ................ B62D 63/025 |

\* cited by examiner

TRACK SYSTEM FOR A VEHICLE

CROSS-REFERENCE TO RELATED APPLICATIONS

The present application is a Continuation application of U.S. patent application Ser. No. 16/193,302 filed Nov. 16, 2018, entitled "Track System For A Vehicle". Through the application Ser. No. 16/193,302, the present application claims priority to the U.S. Provisional Patent Application Ser. No. 62/588,872, filed Nov. 20, 2017, entitled "Track System For A Vehicle". Both applications are incorporated herein by reference in their entirety.

TECHNICAL FIELD

The present technology relates to track systems for vehicles.

BACKGROUND

Certain vehicles, such as, for example, vehicles used in agriculture (e.g., harvesters, combines, tractors, etc.) construction, forestry, mining and powersports, are used to perform work on ground surfaces that are soft, slippery and/or uneven (e.g., soil, mud, sand, ice, snow, etc.).

Such vehicles may be equipped with towable implements used to perform agricultural work (e.g. seeding, spraying, harvesting, etc.). For simplicity, "vehicle" will be used herein as referring to either or both such vehicle and such implements.

Conventionally, such vehicles have had ground engaging assemblies each comprising a wheel mounted with a tire to operate the vehicle along the ground surface. Under certain conditions, such assemblies may have poor traction and stability on some kinds of ground surfaces. As such vehicles are generally heavy, the tires may compact the ground surface under an adversely high pressure owing to the weight of such vehicles being concentrated over a limited ground engaging contact patch area. As an example, when the vehicle is an agricultural vehicle, the tires may compact the soil in such a way as to undesirably inhibit the growth of crops. Furthermore, stability issues due to poor floatation over a ground surface that is uneven or yielding under such pressure may damage the vehicle (e.g. a spray boom extremity colliding with the ground surface) or reduce the quality of the work being performed (e.g. uneven spraying of pesticides).

In order to reduce the aforementioned drawbacks, it was deemed desirable to increase stability and traction by distributing the weight of the vehicle across a larger ground engaging contact area on the ground surface, and track systems were developed to be used as ground engaging assemblies in place of at least some of the wheels and tires on the vehicles.

The use of track systems in place of wheels and tires, however, does present inherent inconveniences. One of the drawbacks of conventional track systems is that they tend to impart an operatively attached vehicle with an increased amount of vibration when operated on uneven ground surfaces due to the loss of the damping otherwise provided by a tire. In addition to potentially increased operator discomfort, these vibrations can potentially lead to premature wear and failure of components of the vehicle (e.g. track system, drive axle assembly, agricultural equipment, etc.). Under certain conditions and at certain increased speeds, the resulting increased vibrations transferred to the chassis may render the vehicle less effective or even unusable for its intended purpose.

Some technologies related to the same technical field may conventionally result in appreciable reduction of the vibration transmitted to a vehicle operatively attached to a track system having an arrangement of damping elements. For instance, such an arrangement may be in the form of resilient elements distributed at the interface of the track system with the vehicle chassis, such as the technology shown in CA 2,546,120. Among other alternatives such as seen in U.S. Pat. No. 5,899,542 and in US 2007/0029871 A1, damping elements may be present on track systems in the form of resilient elements distributed at the interface of the support frame and bogies. Such bogies may be displaced to overcome small ground surface irregularities (e.g. bumps and crevices) when biased by the underlying portion of the endless track entering contact with such irregularities.

Although convenient when operated onto uneven ground surfaces, such improvements may not effectively mitigate the transmission of movements of greater amplitude from a track system to an operatively attached vehicle, as may occur when the vehicle is operated onto a further uneven ground surface having more pronounced irregularities (e.g. slopes, trenches, large rocks, etc.). In such conditions, stability and traction may still be improved.

Accordingly, track systems may be designed to have a pivotable range of motion. Such track systems may be structured and arranged to have a sprocket wheel that is drivingly attachable to a vehicle's drive axle assembly, a support frame that is pivotably attached to the same vehicle drive axle assembly, the support frame having roller wheels and idler wheels rotatably attached to leading and trailing portions of the support frame, defined by the portions in front of and behind the sprocket wheel rotation axis, and an endless track extending around the sprocket wheel, roller wheels and idler wheels. Such track systems may be pivotally displaced to overcome large ground surface irregularities when biased by a portion of the endless track underlying a portion of the support frame enters contact with such surface irregularities. Via a suspension assembly linking the support frame to the chassis of the vehicle, the rotational position of the support frame is generally biased into a neutral position when the track system operated over an even ground surface and limited in range when the track system is operated onto an uneven ground surface.

Such track systems typically require that the drive axle assembly of the vehicle be structured to withstand a greater and more concentrated load due to the support frame not being fixedly attached to the chassis of the vehicle. For similar load distribution purposes, the support frame of such track systems may have portions that are rotatably attached to two portions of the drive axle of the vehicle, longitudinally spaced apart from an outward facing side and from an inward facing side of the sprocket wheel, respectively.

Also, track systems known in the art may benefit from a "split frame" configuration, as shown in U.S. Pat. No. 5,452,949. Such track systems typically comprise a support frame from which downwardly extend two pivotably attached frame members. The leading and trailing members respectively extend frontward and rearward of the support frame, and are pivotably attached thereto either via their own pivot or via a common pivot. Via a suspension assembly linking each member to the support frame, the rotational position of such members is generally biased into a neutral position when the track system is operated over an even, leveled ground surface and the rotational displacement of such members is generally limited in range when the track system is operated onto an uneven ground surface. Leading and trailing members further have a bogie assembly including rotatably attached roller wheels and idler wheels. Bogie assemblies may be fixedly or rotatably attached to a member and may feature damping elements. Advantageously, such track systems may provide reduced transmission of movements from the track system to the vehicle, with vibrations and movements of small amplitude being mitigated by the bogie assemblies, and movements of larger amplitude being mitigated by the "split frame" arrangement of the support frame. Moreover, such systems may have a support frame having a static portion that includes frame portions that are fixedly attachable to the chassis of the vehicle, which may improve load distribution at the interface of the track system and the vehicle. However, this improvement typically comes at the cost of a reduced capacity for the track system to mitigate vibrations and movements, due to the range of motion of movable parts (e.g. leading and trailing members) being hindered by the static parts.

While the technology described above may indeed ameliorate some of the drawbacks of conventional track systems, further improvements in this field remain desirable.

SUMMARY

It is therefore an object of the present technology to ameliorate the situation with respect to at least one of the inconveniences present in the prior art.

It is also an object of the present invention to provide an improved track and suspension system at least in some instances as compared with some of the prior art.

According to an aspect of the present technology, there is provided a track system for use with a vehicle having a chassis and an axle assembly extending laterally outward from the chassis suitable for rotatable connection with the track system. In the context of the present technology, an "axle" of the vehicle shall be understood to be either a "drive axle" or a "dead axle", and either a "straight" axle or a "split axle". A "drive axle" is a vehicle component that ultimately transmits torque generated by the engine to a ground engaging assembly of the vehicle (e.g. a wheel assembly when such is connected to the vehicle or a track system when such is connected to the vehicle, etc.). A "dead axle" is a vehicle component that is not imparted with torque generated by the engine, yet is rotatably connected to the ground engaging assembly of the vehicle for operating and load-bearing purposes. A "straight axle" is a vehicle component that comprises a single shaft that is rotatably connectable to a ground engaging assembly positioned on the left side of the vehicle and to a ground engaging assembly positioned on the right side of the vehicle. A "split axle" is a vehicle component that comprises a left shaft and a right shaft that are rotatably connectable to a ground engaging assembly positioned on the left side of the vehicle and to a ground engaging assembly positioned on the right side of the vehicle, respectively. A "split axle" allows the use of independent suspension systems or differential systems in conjunction with a vehicle's ground engaging assemblies. Various axle configurations can be used in the context of the present technology. As vehicle axles are not central to the present technology, they will not be described in further detail.

The track system includes an attachment assembly that is fastenable to an outward facing, ground-oriented portion of the chassis of the vehicle. The attachment assembly is structured and dimensioned to be received on the chassis at the intersection of the longitudinal midline of the chassis and of the axle of the vehicle to which the track system is drivingly attachable. The attachment assembly also has a central portion and lateral portions extending laterally outwardly from the central portion.

The central portion has a longitudinally aligned depressed portion that has a front tab and a rear tab both adapted to receive fasteners, and respectively extend forward and rearward from the axle of the vehicle to which the track system is drivingly attachable. The central portion further has a laterally oriented raised portion that has left and right fastening interfaces disposed on both sides of the longitudinal midline of the attachment assembly. The lateral portions have track assembly abutting walls oriented outwardly, with concentrically-aligned pivot cylinders extending therefrom. In the context of the present technology, "track assembly" shall be understood to be the ground-engaging subassembly of track system elements of which a pair is disposed and attached bilaterally outwardly from the attachment assembly. The attachment assembly also includes receiving portions adapted to interface with portions of an attached chassis of the track assemblies, thereby blocking degrees of freedom and distributing loads therefrom. The central portion has a chassis receiving portion shaped as a longitudinal cavity in the depressed portion which extends through the raised portion forming a channel, and a plurality of chassis receiving portions shaped as through and non through pockets. The lateral portions have track assembly receiving portions defining a proximal arm extending laterally and upwardly from the abutting walls and distally connected to a housing, a distal arm proximally connected thereto, extending laterally and downwardly and distally connected to a protection pad. The housing is adapted to receive a portion of the sprocket of the track system, and the pad is adapted to receive a movable portion of the support frame of the track system.

The track system further includes a multi-member support frame, whose configuration may also be referred to as "split-frame". The support frame includes a leading member and a trailing member, each having an attachment portion for independently pivoting one frame member with respect to the other about the pivot cylinder, and a suspension portion for interconnecting one frame member to the other via a suspension system. In the context of the present technology, it shall be understood that "leading" elements of a track system attached to a vehicle are disposed toward the front end of the vehicle with respect to their "trailing" counterparts. The leading and trailing members of the support frame are arch-shaped, with their attachment and suspension portions, or "arms", converging forwardly and rearwardly, respectively.

The leading frame member and the trailing frame member of the track system pivot one with respect to the other via their respective attachment arm. Each attachment arm is pivotably connected to the pivot cylinder of the attachment assembly via a bore of a tab of the attachment arm. Each tab has an inwardly facing wall and an outwardly facing wall, both being perpendicular to the axis of the bore. The pivot cylinder of the attachment assembly is pivotably received into the bore of the tab of the trailing attachment, and the inward-facing tab wall of the trailing attachment arm abuts the abutting wall of the attachment assembly. The pivot cylinder of the attachment assembly is pivotably received into the bore of the tab of the leading attachment arm, and the inward-facing tab wall of the leading attachment arm abuts the outward-facing tab wall of the trailing attachment arm. The tabs are positioned inwardly from the sprocket wheel. The pivot cylinder of the attachment assembly is structured and arranged such that the attached leading and trailing members each have a sole degree of freedom for pivoting independently about the pivot cylinder axis.

The suspension arms each have a suspension pivot, both positioned at a same horizontal distance from the longitudinal midline of the chassis of the vehicle. Also, the suspension arm pivots are projected outwardly and upwardly with respect to the attachment arm tabs in such a way that allows clearance between static elements of the track system (e.g. the sprocket wheel and the attachment assembly) and mobile elements of the track system (e.g. leading frame member, trailing frame member and suspension assembly).

The suspension assembly has an extendable member, a forwardmost attachment tab pivotably attached to the leading suspension pivot and a rearwardmost attachment tab pivotably attached to the trailing suspension pivot. The extendable member includes a spring and a damper. The linear displacement of the forwardmost attachment tab with respect to the rearwardmost attachment tab is dynamically determined according to the properties of the spring and damping elements in conjunction with the loading conditions imparted by an attached vehicle operated on a ground surface. In the context of the present invention, the distance between the attachment tabs of the suspension assembly varies between a maximum distance when the suspension assembly is in a deployed position and a minimum distance when the suspension assembly is in a bottomed position.

Each of the leading frame member and the trailing frame member have at least one ground-oriented pivot, either for the pivotable attachment of a wheel-bearing member itself having a plurality of ground-oriented pivots, or for the rotatable attachment of either an idler wheel or a roller wheel.

In some embodiments, the leading frame member has a pivotably attached wheel-bearing member, to which an idler wheel and a roller wheel are rotatably attached, the idler wheel being attached to the forwardmost ground-oriented pivot of the track assembly. The trailing frame member has a pivotably attached wheel-bearing member and a rotatably attached idler wheel, the wheel-bearing member having two rotatably attached roller wheels, and the idler wheel being rotatably attached to the rearmost ground-oriented pivot of the track assembly.

The track system further includes a sprocket wheel connected to the axle assembly of the vehicle and an endless track extending around the sprocket wheel, the wheels of the leading frame assembly and the wheels of the trailing frame assembly, the endless track engaged by the sprocket wheel. When the sprocket wheel of a track system is rotatably connected to a drive axle assembly of a vehicle operating over a ground surface, the sprocket wheel drivingly engages the endless track. When the sprocket wheel of a track system is rotatably connected to a dead axle assembly of a vehicle operating over a ground surface, the sprocket wheel passively engages the endless track.

The track system of the present technology is directed in part toward an improved distribution and withstanding of loads imparted by a vehicle attached thereto under certain conditions. For example, the amount of load transferred from the vehicle to the track assembly via the attachment assembly may, in certain conditions, materially reduce the load transferred from the vehicle to the track assembly via the drive interface of the sprocket wheel which may improve the effectiveness and durability of the track system.

Drawbacks may be found in conventional track systems designed to optimize the distribution of loads from an attached vehicle among the elements of the track system, which typically include and rely on attachments between the support frame to the drive assembly of the vehicle. Such support frame may conventionally include wheel-bearing members designed to movably and resiliently mitigate vibrations and vertical movements imparted by operating the attached vehicle over an uneven ground surface. In some circumstances, the amplitude of movement of support frame members and of wheel-bearing members may be limited by the adjacent fixed support frame attachments, and hence may not fully address operator discomfort, premature vehicle wear and counterproductive vehicle instability issues. The track system of the present technology is directed toward the mitigation of such issues.

For instance, the vibrations imparted to a vehicle attached to the track system and operated over a ground surface may be, under certain conditions, sufficiently dampened through the interface between the attachment assembly and the chassis of the vehicle. Furthermore, when the vehicle is operated over a ground surface having irregularities of small amplitude, the resulting vibrations may be sufficiently damped due in part by the inherent resilience of the track system. This resilience is derived from the arrangement of idler wheels and roller wheels of the track system, attached to ground-oriented pivots of leading frame members, trailing frame members and their pivotably attached wheel-bearing members, in conjunction with the materials used to manufacture such elements.

Advantageously, the means to attach the track assemblies of the track system to the vehicle is decoupled into a driving attachment via the drive interface of the sprocket wheel and into a load bearing attachment via the pivot cylinder of the attachment assembly. As the load bearing attachment is spaced apart and distinct from the axle assembly of the vehicle, the elements of the track system are structured and arranged one with respect to the other such that the movable elements of the system such as the leading frame member, the trailing frame member, their respective wheel-bearing members and the suspension assembly, have an optimized amplitude of movement with respect to static elements such as the sprocket wheel, the attachment assembly and the vehicle.

The leading and trailing frame members of the track system of the present technology define a "split-frame" configuration, with each frame member pivotable about the same pivot cylinder axis, and the suspension assembly connected therebetween. In the context of the present technology, a half track assembly shall be understood to be one of the leading frame member or the trailing frame member, frame member's wheel-bearing members, their respectively attached wheels and the portions of the endless track that interface between those wheels and a ground surface.

The split-frame configuration and optimized movement amplitude of the track system's movable elements may yield noticeable improvements under certain conditions when a vehicle is operatively attached to one or more track systems and its track assemblies are unevenly loaded. For instance, when operated over an uneven ground surface having irregularities of larger amplitude, such an irregularity may bias a half track assembly to dynamically adapt the position and area of the endless track portion as a function of the vertical and longitudinal dimensions (with respect to the vehicle) of the irregularity thereby imparting movements of a lesser vertical and longitudinal amplitude to its counterpart or to the vehicle via their respective resilient attachments through the support frame.

In some situations, the suspension assembly of the track system may assist in dampening the rotation of a biased half track assembly as it approaches the bottomed operative position. Also, the suspension assembly may assist in biasing the rotation of a half track assembly intermediate an operative position and the deployed operative position as the loading conditions are modified.

In addition, the track system may provide further advantages when attached to a vehicle operated over an even ground surface. When the track system is loaded according to a given distribution of weight carried by the vehicle, which may also increase and shift (e.g. during harvesting operations), the leading and trailing half track assemblies of the track system move forwardly and rearwardly respectively to adjust the area of the ground-contacting portion of endless track thereby dynamically distributing the load to the ground with an optimized pressure and, under certain conditions, improving the stability of the vehicle by mitigating the risk of the ground yielding under a concentrated load.

In some embodiments, the lateral portions are fixedly detachable from the central portion of the attachment assembly, which may facilitate the removal of track assemblies of the track system for maintenance or for replacement with other ground-engaging assemblies such as wheel assemblies.

In some embodiments, the receiving portions of the lateral portions of the attachment assembly have a housing for receiving a portion of the sprocket wheel such as a fixed portion of a bearing assembly. This may assist in efficiently distributing the load from the vehicle to the track assembly of the track system to improve the durability and mitigation of vibrations.

In some embodiments, a receiving portion of the lateral portion of the attachment assembly has a pad for limiting the upward rotational amplitude of the leading frame member. This movement limitation may assist in defining the bottomed operative position of the track system.

In some embodiments, a receiving portion of the lateral portion of the attachment assembly has a pad for limiting the upward rotational amplitude of the trailing frame member. This movement limitation may assist in defining the bottomed operative position of the track system.

In some embodiments, the leading attachment arm and the trailing attachment arm are positioned differently with respect to the attachment assembly. The pivot cylinder of the attachment assembly is pivotably received into the bore of the tab of the leading attachment, and the inward-facing tab wall of the leading attachment arm abuts the track assembly abutting wall of the attachment assembly. The pivot cylinder of the attachment assembly is pivotably received into the bore of the tab of the trailing attachment, and the inward-facing tab wall of the trailing attachment arm abuts the outward-facing tab wall of the trailing attachment arm.

In some embodiments, the leading attachment arm, the trailing attachment arm, the pivot cylinder and the sprocket wheel are structured and arranged one with respect to the other such that the leading attachment arm tab and the trailing attachment arm tab are positioned outwardly from the sprocket wheel.

In some embodiments, the leading attachment arm, the trailing attachment arm, the pivot cylinder and the sprocket wheel are structured and arranged one with respect to the other such that the leading attachment arm tab and the trailing attachment arm tab are positioned bilaterally from the sprocket wheel.

In some embodiments, the suspension assembly has a pair of extensible members each having a spring element and a damping element, disposed intermediate a forwardmost attachment tab and a rearwardmost attachment tab. The forwardmost extensible member is pivotably attached to the leading suspension pivot via its forwardmost attachment tab, and to a suspension link via its rearwardmost attachment tab. The rearwardmost extensible member is pivotably attached to the suspension link via its forwardmost attachment tab, and to the trailing suspension tab via its rearwardmost attachment tab.

In some embodiments, the suspension assembly is a pneumatic suspension assembly or a hydraulic suspension assembly.

In some embodiments, an actuator of the vehicle is operatively connected to the suspension assembly, and capable of adjusting the length, spring properties and damping properties of each extensible element automatically according to vehicle operating conditions (e.g. carried weight, speed, ground surface regularity, etc.) or selectably according to vehicle operator selection based on operating needs (e.g. comfort level, work to be performed, equipment requirements, etc.). This feature may assist in adjusting the operative position and performance of a track assembly of the track system according to operating conditions or operating needs.

In some embodiments, each idler wheel and each roller wheel represents an assembly of a pair of concentrically-aligned wheels of a same dimension.

According to another aspect of the present technology, there is provided a track system for a vehicle, the vehicle having a chassis and an axle assembly extending laterally outwardly from the chassis suitable for the track system to be rotatably connected thereto. The track system has an attachment assembly mountable to the chassis of the vehicle. The attachment assembly includes an attachment-assembly pivotable connector extending laterally outward from the chassis when the attachment assembly is mounted to the chassis, the attachment assembly pivotable connector defining an attachment-assembly-pivotable connector pivot axis. The track system further has a track assembly including a support frame disposed laterally outward from the attachment assembly when the attachment assembly is mounted to the vehicle, the support frame including a leading frame assembly and a trailing frame assembly. Each frame assembly includes a frame member having a frame-attachment pivotable connector connectable to the attachment-assembly pivotable connector, and a frame-suspension pivotable connector defining a frame-suspension-pivotable-connector pivot axis. Each frame assembly further has at least one wheel-load-bearing connector, and at least one wheel being at least indirectly connected to the frame member via the at least one wheel-load-bearing-connector. The track system further has a sprocket wheel rotatable about a sprocket axis and connectable to the axle assembly of the vehicle, an endless track extending around the sprocket wheel and the at least one idler wheel of the leading frame assembly and the at least one idler wheel of the trailing frame assembly. The track system further has a suspension assembly having a forward suspension pivotable connector pivotably attached to the leading frame-suspension pivotable connector, a rearward suspension pivotable connector pivotably attached to the trailing frame-suspension pivotable connector, and a suspension member operatively connected to the forward suspension pivotable connector and to the rearward suspension pivotable connector.

In some embodiments, the suspension member has a forward member pivotable connector pivotably connected to the forward suspension pivotable connector, and a rearward member pivotable connector pivotably connected to the rearward suspension pivotable connector.

In some embodiments, the suspension member has a spring and a damper.

In some embodiments, the attachment assembly is solely connected to the track assembly via the leading frame-attachment pivotable connector and the trailing frame-attachment pivotable connector.

In some embodiments, the suspension assembly is solely connected to a remainder of the track assembly via the leading frame-suspension pivotable connector and the trailing frame-suspension pivotable connector.

In some embodiments, a load of the vehicle is transmitted to the track assembly via the attachment assembly.

In some embodiments, the leading and trailing frame suspension pivotable connectors are disposed outwardly from the sprocket wheel, and the leading and trailing frame-attachment pivotable connectors are disposed inwardly from the sprocket wheel.

In some embodiments, the attachment assembly has a plurality of receiving portions adapted for receiving portions of the chassis of the vehicle.

In some embodiments, the attachment assembly has an outwardly facing abutment from which the attachment assembly pivotable connector extends laterally outward.

In some embodiments, when the pivot axis of the leading frame suspension pivotable connector is in a highest position, the leading frame assembly is in a bottomed position.

In some embodiments, when the pivot axis of the trailing frame suspension pivotable connector is in a highest position, the trailing frame assembly is in a bottomed position.

In some embodiments, when the leading frame assembly and trailing frame assembly are in a bottomed position, the leading frame-suspension-pivotable-connector pivot axis and the trailing frame-suspension-pivotable-connector pivot axis are at a position that is higher than the position of the attachment-assembly-pivotable connector pivot axis.

In some embodiments, the suspension member is a leading suspension member having a forward leading member pivotable connector pivotably connected to the forward suspension pivotable connector, and a rearward leading member pivotable connector pivotably connected to a link, and the suspension assembly further has a trailing suspension member having forward trailing member pivotable connector pivotably connected to the link and a rearward trailing member pivotable connector pivotably connected to the rearward suspension pivotable connector.

In some embodiments, each of the leading suspension member and the trailing member has a spring and a damper.

In some embodiments, the leading and trailing frame suspension pivotable connectors are disposed inwardly from the sprocket wheel.

In some embodiments, the leading and trailing attachment pivotable connectors are disposed inwardly from the sprocket wheel.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

Figure 1:
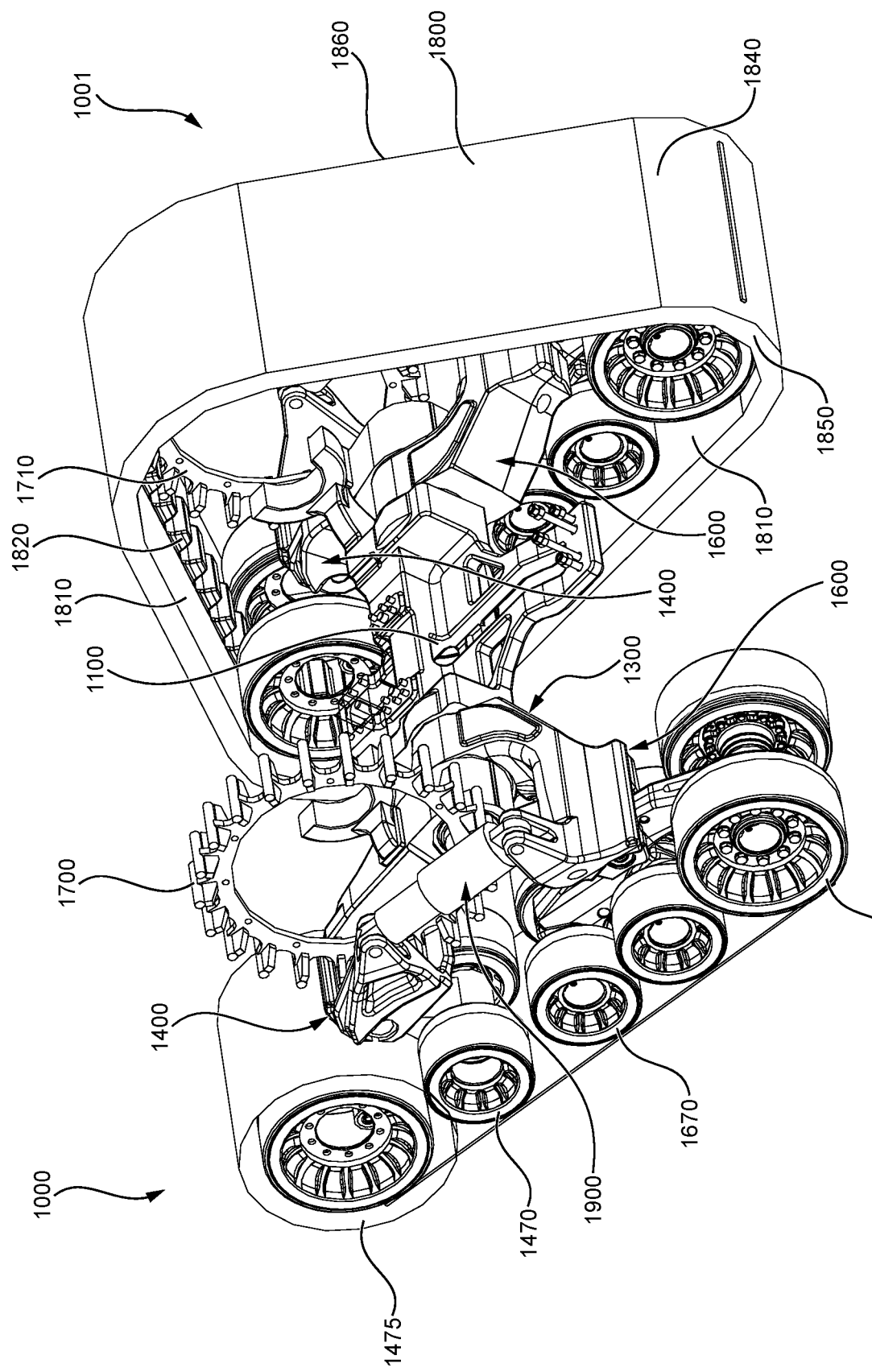
FIG. 1 is a perspective view taken from a rear, top, left side of a track system being an embodiment of the present technology, the left track assembly of the track system being shown without the endless track for clarity.

With reference to FIGS. 1 to 5, an embodiment of the present technology, track system 1000, will be described. In addition, with reference to FIGS. 6 and 7, another embodiment of the present technology, track system 2000, will be described. It is to be expressly understood that the track system 1000 and the track system 2000 are merely embodiments of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to track system 1000 and track system 2000 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the track system 1000 and the track system 2000 may provide in certain aspects a simple embodiment of the present technology, and that where such is the case it has been presented in this manner as an aid to understanding. As persons skilled in the art would understand, various embodiments of the present technology may be of a greater complexity than what is described herein.

In the context of the following description, "outwardly" or "outward" means away from a longitudinal centerline 40 (FIG. 2) of the chassis of the vehicle (not shown), and "inwardly" or "inward" means toward the longitudinal centerline 40. In addition, in the context of the following description, "longitudinally" means in a direction parallel to the longitudinal centerline 40 of the chassis of the vehicle.

In the following description and in the accompanying Figures, the track system 1000 (FIGS. 1 to 5) and the track system 2000 (FIGS. 6 and 7) are configured to be attached to a left side of the chassis of the vehicle. The Figures also show other track systems 1001, 2001 being another embodiment of the present technology, configured to be connected to a right side of the chassis of the vehicle, adapted as a mirror image of the track systems 1000, 2000. As the mirror images 1001, 2001 of track systems 1000, 2000 require no further adaptation, they will not be further described herein.

Shown track systems 1000, 2000 are for use with a vehicle (not shown) having a chassis (not shown) and an axle assembly (not shown) extending laterally outward from the chassis for connecting to shown track systems 1000, 2000. The chassis supports the components of the vehicle, such as the cabin, the engine, the gearbox and other drivetrain components (not shown). In these embodiments, the axle assembly is a drive axle assembly that rotatably connects the vehicle to the track systems 1000, 2000 and thereby transmits a driving torque from the engine and gearbox of the vehicle to the track systems 1000, 2000.

General Description of the Track System

Referring to FIGS. 1 to 5, the track system 1000 will be generally described. The track system 1000 includes an attachment assembly 1100 mountable to the chassis of the vehicle. The attachment assembly 1100 includes a central portion 1110, a lateral portion 1150, and an attachment-assembly-pivotable connector 1160 (FIG. 3) extending laterally outward from the attachment assembly 1100.

The track system 1000 further includes a support frame 1300 disposed laterally outward from the attachment assembly 1100 (FIG. 1). The support frame 1300 includes a leading frame assembly 1400 and a trailing frame assembly 1600.

The leading frame assembly 1400 includes a leading frame member 1410, a wheel-bearing member 1450 (FIG. 4), support wheels 1470 and idler wheels 1475. The leading frame member 1410 is pivotably connected to the attachment assembly 1100. The wheel-bearing member 1450 is pivotably connected to the leading frame member 1410. The support wheels 1470 and the idler wheels 1475 are rotatably connected to the wheel-bearing member 1450.

The trailing frame assembly 1600 includes a trailing frame member 1610, a wheel-bearing member 1650 (FIG. 4), support wheels 1670 and idler wheels 1675. The trailing frame member 1610 is pivotably connected to the attachment assembly 1100. The wheel-bearing member 1650 is pivotably connected to the trailing frame member 1610. The support wheels 1670 and the idler wheels 1675 are rotatably connected to the wheel-bearing member 1650.

The track system 1000 further includes a sprocket wheel 1700 rotatable about a sprocket axis (not shown). The sprocket wheel 1700 has a connecting portion (not shown) suitable to be rotatably connected to the axle assembly of the vehicle.

The track system 1000 further includes an endless track 1800 extending around the sprocket wheel 1700, around the support wheels 1470 and idler wheels 1475 of the leading frame assembly 1400, and around the support wheels 1670 and idler wheels 1675 of the trailing frame assembly 1600. The endless track 1800 is drivable by the sprocket wheel 1700.

The track system 1000 further includes a suspension assembly 1900. The suspension assembly 1900 has a suspension member 1910 (being a shock absorber in this embodiment). The suspension assembly 1900 is pivotably connected to the leading frame member 1410 and to the trailing frame member 1610, and is outwardly disposed with respect to the sprocket wheel 1700.

Figure 6:
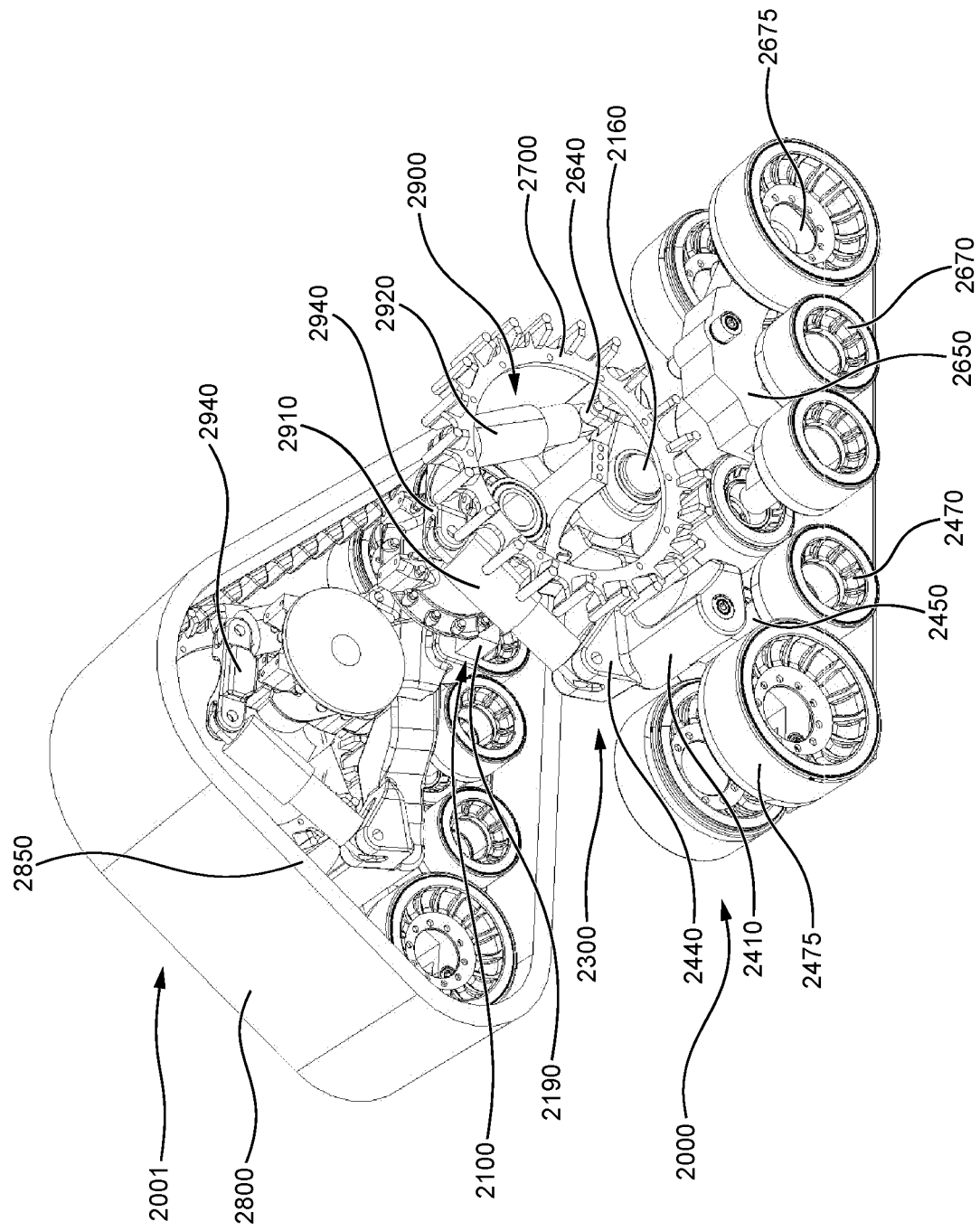
FIG. 6 is a perspective view taken from a front, top, left side of left and right track assemblies of a track system being an alternative embodiment of the present technology, the left track assembly being shown without the endless track and without the drive interface of the sprocket wheel, for clarity.
Figure 7:
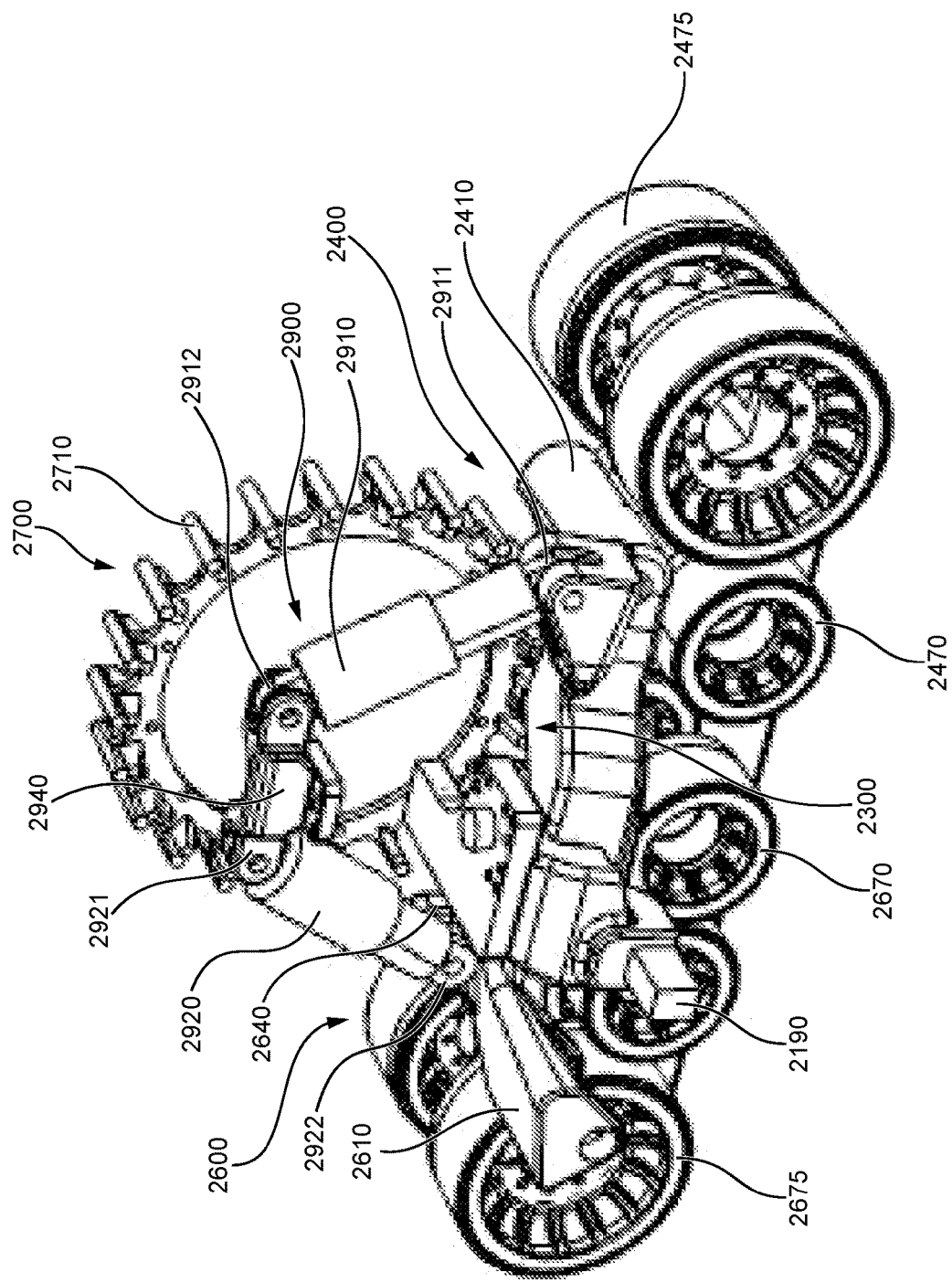
FIG. 7 is a perspective view taken from a front, top, right side of the left track assembly of FIG. 6, the left track assembly being shown without the endless track and without the drive interface of the sprocket wheel, for clarity.

Referring to FIGS. 6 and 7, the track system 2000 will be generally described. The track system 2000 includes an attachment assembly 2100 mountable to the chassis of the vehicle. The attachment assembly 2100 includes a central portion similar to the central portion 1110 (FIG. 4), a lateral portion similar to the lateral portion 1150 (FIG. 2) and extending outward from the central portion. The lateral portion is detachable from the central portion. The attachment assembly 2100 further includes an attachment-assembly-pivotable connector 2160 which extends outward from the lateral portion.

The track system 2000 further includes a support frame 2300 disposed laterally outward from the attachment assembly 2100 (FIG. 6). The support frame 2300 includes a leading frame assembly 2400 and a trailing frame assembly 2600 (FIG. 7).

The leading frame assembly 2400 includes a leading frame member 2410, a wheel-bearing member 2450, support wheels 2470 and idler wheels 2475. The leading frame member 2410 is pivotably connected to the attachment assembly 2100 via the attachment-assembly pivotable connector 2160. The wheel-bearing member 2450 is pivotably connected to the leading frame member 2410. The wheels 2470 and the idler wheels 2475 are rotatably connected to the wheel-bearing member 2450.

The trailing frame assembly 2600 includes a trailing frame member 2610, a wheel-bearing member 2650, support wheels 2670 and idler wheels 2675. The trailing frame member 2610 is pivotably connected to the attachment assembly 2100 via the attachment-assembly pivotable connector 2160. The wheel-bearing member 2650 is pivotably connected to the trailing frame member 2610. The wheels 2670 and the idler wheels 2675 are rotatably connected to the wheel-bearing member 2650.

The track system 2000 further includes a sprocket wheel 2700 rotatable about a sprocket axis (not shown), and further includes a connecting interface suitable to be rotatably connected to the axle assembly of the vehicle 10.

The track system 2000 further includes an endless track 2800 extending around the sprocket wheel 2700, around the wheels 2470 and idler wheels 2475 of the leading frame assembly 2400, and around the wheels 2670 and idler wheels 2675 of the trailing frame assembly 2600. The endless track 2800 is drivable by the sprocket wheel 2700.

The track system 2000 further includes a suspension assembly 2900. The suspension assembly 2900 has two suspension members 2910, 2920 (being shock absorbers in this embodiment) pivotably interconnected by a link 2940. The suspension member 2910 is pivotably connected to the leading frame member 2410. The suspension member 2920 is pivotably connected to the trailing frame member 2610. The suspension assembly 2900 is inwardly disposed with respect to the sprocket wheel 2700.

Attachment Assembly

Figure 4:
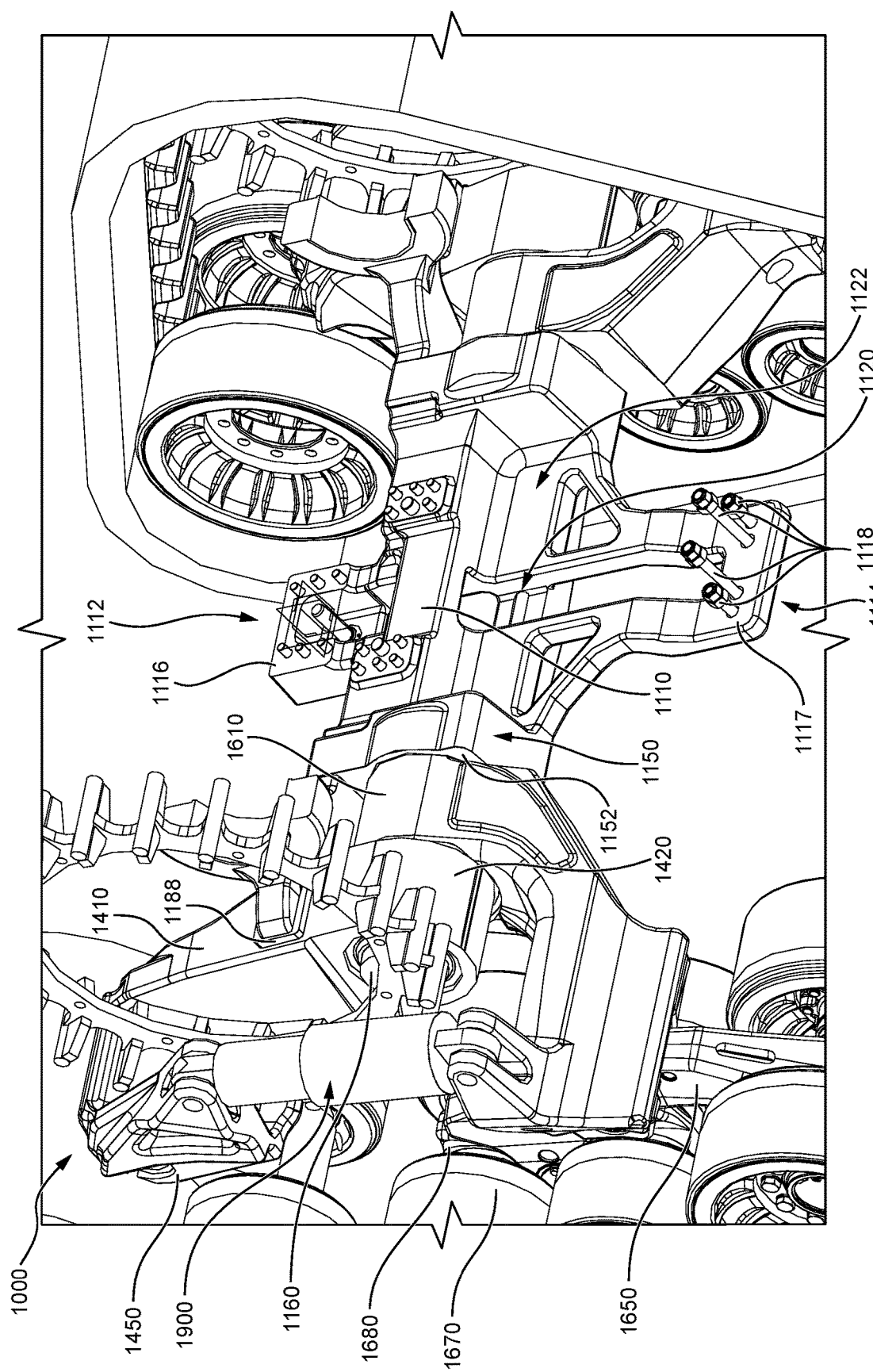
FIG. 4 is a close-up perspective view taken from a rear, top, left side of the attachment assembly of the track system of FIG. 1.

Referring back to FIGS. 2 and 4, the central portion 1100 defines vertical receiving portions 1120 and a horizontal receiving portion 1122 for receiving portions of the chassis of the vehicle. The central portion 1100 includes a front portion 1112 and a rear portion 1114 on which are disposed fastener interfaces 1116, 1117 for fastening the attachment assembly 1100 to the chassis of the vehicle. Fastener interface 1117 receives fasteners 1118 such as bolts (FIG. 4).

Figure 2:
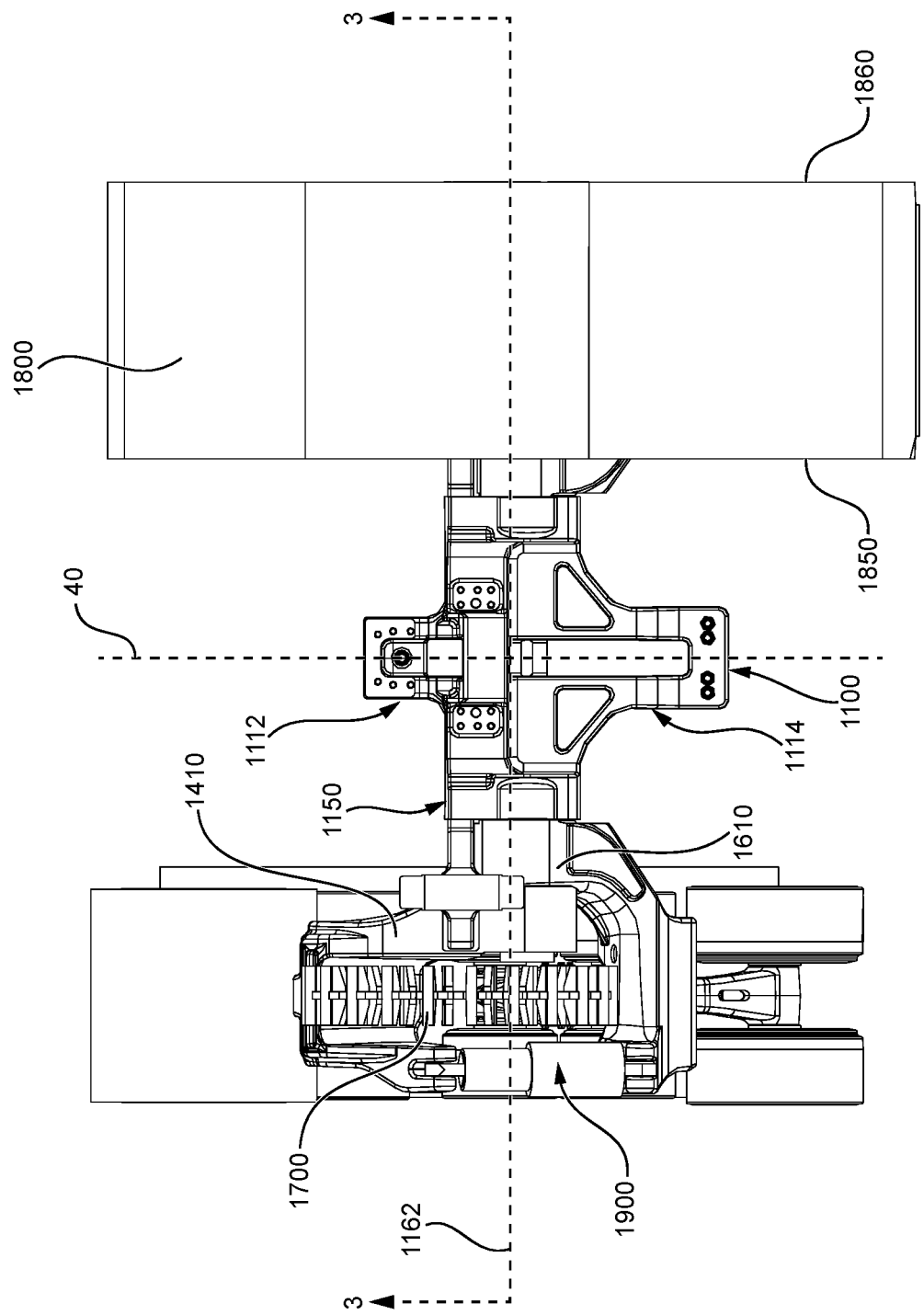
FIG. 2 is a top plan view of the track system of FIG. 1.
Figure 3:
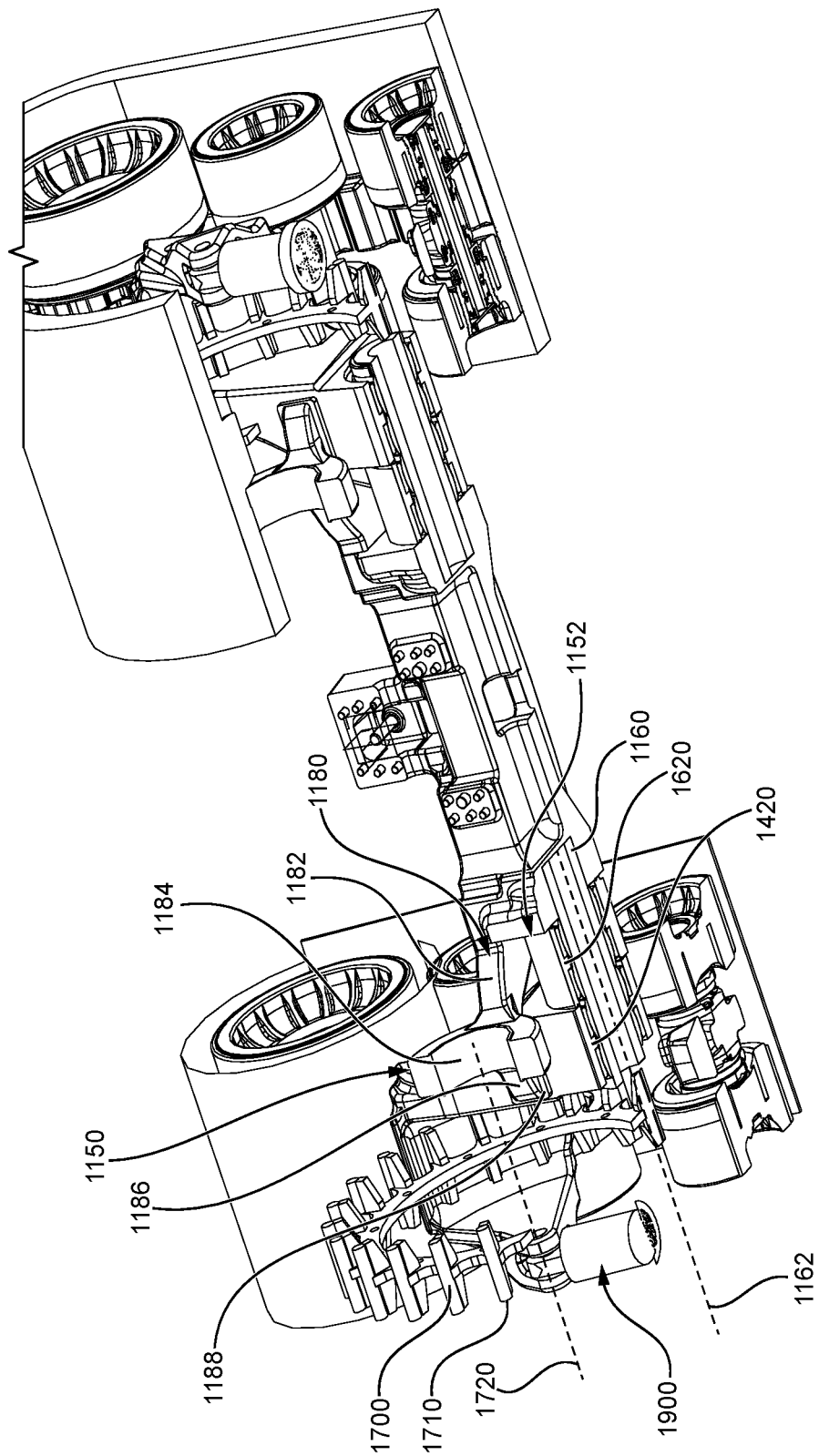
FIG. 3 is a perspective cross-sectional view of the track system of FIG. 1 taken along cross-section line 3-3 of FIG. 2.

The lateral portion 1150 includes an outwardly-facing abutment 1152 and an attachment-assembly-pivotable connector 1160 (FIG. 4) defining an attachment-assembly-pivotable connector axis 1162 (shown in FIG. 2 overlapping cross-section line 3-3). The attachment-assembly-pivotable connector 1160 extends outward from the abutment 1152. The lateral portion 1150 further includes a track assembly receiving portion 1180, extending outwardly from the abutment 1152. As best shown in FIG. 3, the track assembly receiving portion 1150 has a proximal arm 1182, a brace 1184 for receiving an axle casing of the vehicle, a distal arm 1186 and a pad 1188. In some embodiments, the brace 1184 is configured to non-engagingly support the sprocket wheel 1700 in order to reduce the vertical load transmitted to the axle assembly of the vehicle without undesirably limiting the rotation of the sprocket wheel 1700. In some embodiments, the pad 1188 is adapted to limit the pivoting movement of the leading frame member 1410 when a portion of the leading frame member 1410 makes contact with the pad 1188, thereby defining the bottomed position of the leading frame member 1410. In some embodiments, the attachment assembly 1100 does not include a track assembly receiving portion 1180.

In the other embodiment of the present technology shown in FIGS. 6 and 7, the attachment assembly 2100 of the track system 2000 has a central portion and a lateral portion detachable therefrom via a mounting portion 2190. The lateral portion has an attachment-assembly-pivotable connector 2160 pivotably connected to leading and trailing frame members 2410, 2610 and indirectly connected to the remainder of the track system 2000. Under certain conditions, the maintenance of the track system 2000 or its substitution by a wheel assembly is facilitated by detaching the lateral portion from the central portion and leaving the central portion mounted to the chassis of the vehicle.

Support Frame

Referring back to FIGS. 1 to 5, the track system 1000 includes the support frame 1300 disposed laterally outward from the attachment assembly 1100. The support frame 1300 includes the leading frame assembly 1400 and the trailing frame assembly 1600.

Figure 5:
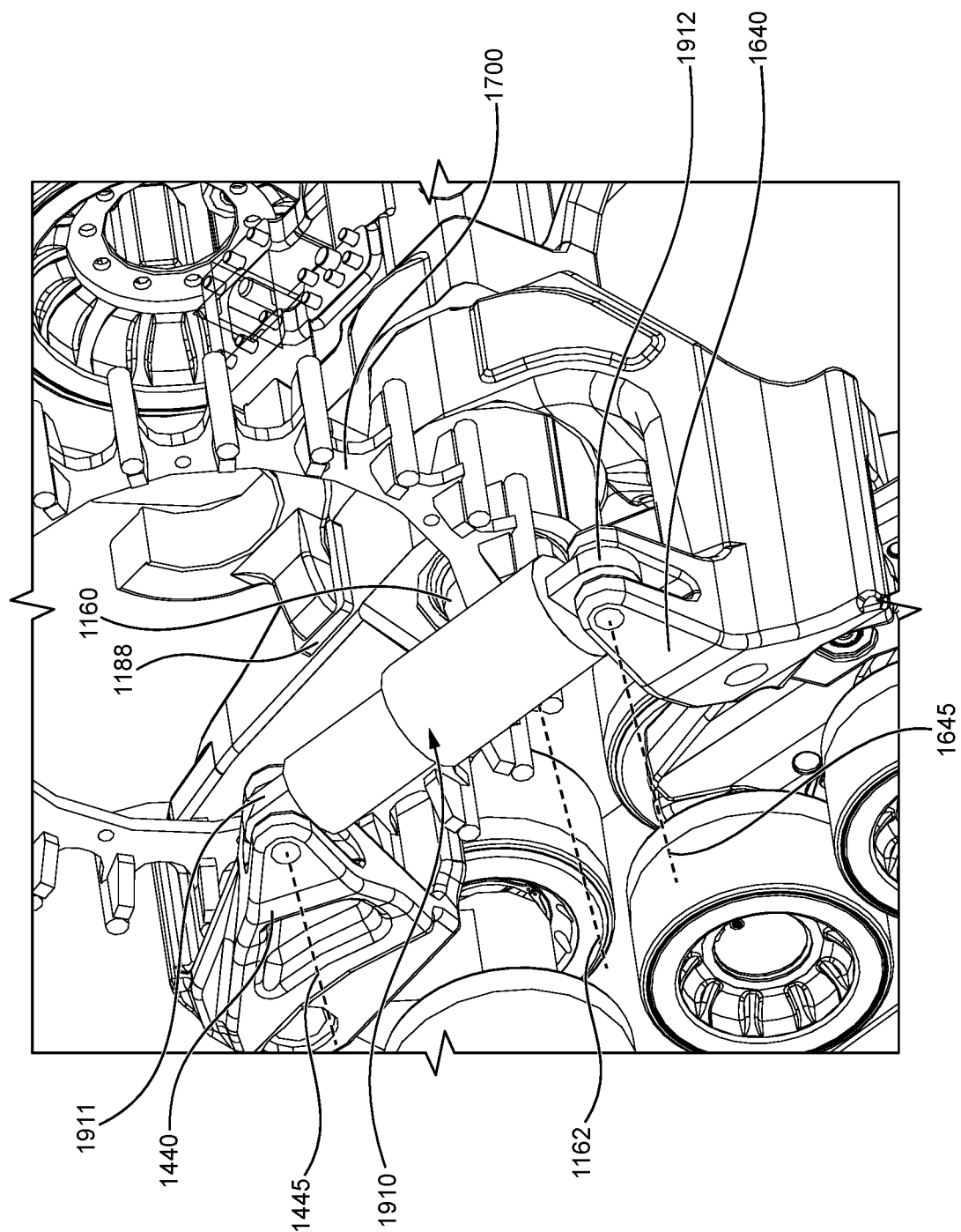
FIG. 5 is a close-up perspective view taken from a rear, top, left side of the left leading frame member, trailing frame member and suspension assembly of the track system of FIG. 1.

The trailing frame assembly 1600 includes a trailing frame member 1610 having an arm-like structure, best seen in FIG. 2. The trailing frame member 1610 has a trailing frame-attachment pivotable connector 1620 (FIG. 3) that abuts the abutment 1152 and is pivotably connected to the attachment-assembly-pivotable connector 1160. The trailing frame member 1610 pivots about the attachment-assembly-pivotable connector pivot axis 1162. The trailing frame member 1610 further has the wheel-bearing member 1650 to which are rotatably connected the support wheels 1670 and idler wheels 1675, the idler wheels 1675 being the trailing wheels of the track system 1000. The support wheels 1670 are mounted in a tandem configuration via a tandem assembly 1680 (FIG. 4) pivotably connected to the wheel-bearing member 1650. The trailing frame member 1610 further has a trailing frame-suspension pivotable connector 1640 that defines a trailing frame-suspension pivotable connector axis 1645 (FIG. 5).

Referring to FIGS. 1, 2 and 4, the leading frame assembly 1400 includes the leading frame member 1410 having an arm-like structure, as best seen in FIG. 4. The leading frame member 1410 has the leading frame-attachment pivotable connector 1420 that abuts the trailing frame-attachment pivotable connector 1620. The leading frame-attachment pivotable connector 1420 is disposed outward from the trailing frame-attachment pivotable connector 1620. The leading frame member 1410 is pivotably connected to the attachment-assembly-pivotable connector 1160. The leading frame member 1410 further has the wheel-bearing member 1450 to which are rotatably connected the support wheels 1470 and the idler wheels 1475, the idler wheels 1475 being the leading wheels of the track system 1000. Referring to FIG. 5, the leading frame member 1410 further has a leading frame-suspension pivotable connector 1440 that defines a leading frame-suspension pivotable connector axis 1445.

The leading and trailing frame-attachment pivotable connectors 1420, 1620 are disposed inwardly with respect to the sprocket wheel 1700. The leading and trailing frame-suspension pivotable connectors 1440, 1640 are disposed outwardly with respect to the sprocket wheel 1700.

Sprocket Wheel

Referring to FIGS. 1 to 7, the sprocket wheel 1700 includes an axle assembly interface (not shown) defining a sprocket axis 1720 (FIG. 3). The sprocket wheel 1700 has teeth 1710. The axle assembly interface of the sprocket wheel 1700 is connectable to the axle assembly of the vehicle for rotating the sprocket wheel 1700 about the sprocket axis 1720. When the track system 1000 is drivingly connected to the drive axle assembly of the vehicle, the sprocket wheel 1700 drivingly rotates about the sprocket axis 1720 and the teeth 1710 drivingly engage the endless track 1800. In some embodiments of the present technology, the sprocket wheel 1700 further includes a support interface (not shown) adapted to be received in a track assembly receiving portion 1150 of the attachment assembly 1100.

Endless Track

Referring to FIGS. 1, 2, 3, and 5, the endless track 1800 is an endless polymeric track. For clarity, the endless track 1800 is shown on the mirror image 1001 of the track system 1000 configured to be connected on the right side of the chassis of the vehicle. The endless track 1800 has an inner surface 1810 engaging the leading support wheels 1470 and leading idler wheels 1475, the trailing support wheels 1670 and the trailing idler wheels 1675 and the sprocket wheel 1700. The inner surface has lugs 1820 (FIG. 1) disposed on a central portion of the inner surface 1810 for engaging the teeth 1710 of the sprocket wheel 1700. The endless track 1800 also has an outer surface 1840 with a tread (not shown) configured for ground engagement. The tread can be varied according to the type of vehicle on which the track system 1000, 1001 is to be used with and/or the type of ground surface on which the vehicle will be driven. The endless track 1800 further has internal and external walls 1850, 1860, disposed inwardly from and outwardly of the leading and trailing frame assemblies 1410, 1610 and the sprocket wheel 1700. It is contemplated that within the scope of the present technology, the endless track 1800 may be constructed of a wide variety of materials and structures including metallic components known in track systems. The specific properties and materials of the endless track 1800 are not central to the present technology and will not be described in detail.

Suspension Assembly

Referring to FIGS. 1, 2, 4 and 5, the suspension assembly 1900 includes a suspension member 1910 being a shock absorber and rotatably connected to the frame-suspension pivotable connectors 1440, 1640 via a forward suspension pivotable connector 1911 and a rearward suspension pivotable connector 1912 (FIG. 5). The suspension assembly 1900 and the leading and trailing-frame-suspension pivotable connectors 1440, 1640 are disposed inwardly from the endless track external wall 1860, outwardly of the sprocket wheel 1700 and upwardly from the leading support wheels 1470 and trailing support wheels 1670. The forward and rearward suspension pivotable connectors 1911, 1912 are disposed forward and rearward respectively and above the attachment-assembly-pivotable connector pivot axis 1162 (FIG. 5).

The arrangement of the suspension assembly 1900 as described allows the damping of the movements of the leading and trailing frame assemblies 1400, 1600 and still allows adequate amplitude of movement thereof. FIG. 1 shows the track system 1000 positioned as when attached to a vehicle disposed on a leveled ground surface, with the suspension assembly 1900 in an operative position. The suspension member 1910, in this embodiment being a damper, is shown having a length intermediate its shortest length (compressed, bottomed) and longest length (extended, deployed), the length and shock absorption capacity being determined according to the stroke length and mechanical properties (e.g. damping ratio, spring constant) of the suspension member 1910 as a function of the load borne thereby.

In the embodiment of the present technology shown in FIGS. 6 and 7, the suspension assembly 2900 of the track system 2000 has leading and trailing suspension members 2910, 2920 and a link 2940 pivotably interconnected thereto. The leading suspension member 2910 is pivotably connected to the leading-frame-suspension pivotable connector 2440 and to the link 2940 via the forward and rearward leading suspension pivotable connectors 2911, 2912. The trailing suspension member 2920 is pivotably connected to the link 2940 and to the trailing-frame-suspension pivotable connector 2640 via the forward and rearward trailing suspension pivotable connectors 2921, 2922. As seen on FIG. 6, the suspension assembly 2900 and the leading and trailing frame-suspension pivotable connectors 2440, 2640 are disposed outwardly from the endless track internal wall 2850 (shown on the right side mirror image), inwardly from the sprocket wheel 2700 and upwardly from the leading and trailing support wheels 2470, 2670. The forward leading and the rearward trailing suspension pivotable connectors 2911, 2922 extend above the attachment-assembly-pivotable connector 2160 and are disposed forward and rearward therefrom respectively. The leading and trailing suspension members 2910, 2920 are disposed forward and rearward respectively of the sprocket axis, and the link 2940 is disposed above thereof.

In some embodiments, the length and shock absorption capacity of the suspension members 1910, 2910 are remotely adjustable by the operator of the vehicle via an actuator thereof. In some embodiments, the suspension members 1910, 2910 are replaced by other adequate shock absorbing arrangements known in the art.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A track system for a vehicle, the vehicle having a chassis and an axle assembly extending laterally outwardly from the chassis suitable for the track system to be rotatably connected thereto, the track system comprising:
   an attachment assembly mountable to the chassis of the vehicle, the attachment assembly including an attachment assembly pivotable connector extending laterally outward from the chassis when the attachment assembly is mounted to the chassis, the attachment assembly pivotable connector defining an attachment-assembly-pivotable connector pivot axis;
   a track assembly including
      a support frame disposed laterally outward from the attachment assembly when the attachment assembly is mounted to the vehicle, the support frame including a leading frame assembly and a trailing frame assembly, each frame assembly including
         a frame member having a frame-attachment pivotable connector connectable to the attachment assembly pivotable connector and a frame-suspension pivotable connector defining a frame-suspension-pivotable-connector pivot axis,
         at least one wheel-load-bearing connector, and
         at least one idler wheel being at least indirectly connected to the frame member via the at least one wheel-load-bearing connector;
      a sprocket wheel rotatable about a sprocket axis and connectable to the axle assembly of the vehicle;
      an endless track extending around the sprocket wheel and the at least one idler wheel of the leading frame assembly and the at least one idler wheel of the trailing frame assembly; and
      a suspension assembly having
         a link;
         a forward leading suspension pivotable connector pivotably attached to the leading frame-suspension pivotable connector;
         a rearward leading suspension pivotable connector pivotably attached to the link;
         a leading suspension member pivotably connected to the forward leading suspension pivotable connector and to the rearward leading suspension pivotable connector;
         a rearward trailing suspension pivotable connector pivotably attached to the trailing frame-suspension pivotable connector;
         a forward trailing suspension pivotable connector pivotably attached to the link; and
         a trailing suspension member pivotably connected to the rearward trailing suspension pivotable connector and to the forward trailing suspension pivotable connector.

2. The track system of claim 1, wherein the leading and trailing frame-suspension pivotable connectors are disposed outwardly from an internal wall of the endless track.

3. The track system of claim 1, wherein the leading and trailing frame-suspension pivotable connectors are disposed inwardly from the sprocket wheel.

4. The track system of claim 1, further comprising at least one support wheel operatively connected to the at least one wheel-load-bearing connector, and wherein the leading and trailing frame-suspension pivotable connectors are disposed upwardly from the at least one support wheel.

5. The track system of claim 1, wherein the forward leading suspension pivotable connector extends above and forward of the attachment-assembly pivotable connector.

6. The track system of claim 1, wherein the rearward trailing suspension pivotable connector extends above and rearward of the attachment-assembly pivotable connector.

7. The track system of claim 1, wherein the leading suspension member is disposed forward of the sprocket axis.

8. The track system of claim 1, wherein the trailing suspension member is disposed rearward of the sprocket axis.

9. The track system of claim 1, wherein the link is disposed above the sprocket axis.

10. The track system of claim 1, wherein each one of the leading suspension member and the trailing suspension member has a spring and a damper.

11. The track system of claim 1, wherein the attachment assembly is solely connected to the track assembly via the leading frame-attachment pivotable connector and the trailing frame-attachment pivotable connector.

12. The track system of claim 1, wherein a load of the vehicle is transmitted to the track assembly via the attachment assembly.

13. The track system of claim 1, wherein the attachment assembly has a plurality of receiving portions adapted for receiving portions of the chassis of the vehicle.

14. The track system of claim 1, wherein the attachment assembly has an outwardly facing abutment from which the attachment assembly pivotable connector extends laterally outward.

15. The track system of claim 1, wherein when the leading frame-suspension-pivotable-connector pivot axis is in a highest position, the leading frame assembly is in a bottomed position.

16. The track system of claim 1, wherein when the trailing frame-suspension-pivotable-connector pivot axis is in a highest position, the trailing frame assembly is in a bottomed position.

17. The track system of claim 1, wherein when the leading frame assembly and trailing frame assembly are in a bottomed position, the leading frame-suspension-pivotable-connector pivot axis and the trailing frame-suspension-pivotable-connector pivot axis are at a position that is higher than the position of the attachment-assembly-pivotable connector pivot axis.

* * * * *